US010845286B2

(12) United States Patent
Allier et al.

(10) Patent No.: US 10,845,286 B2
(45) Date of Patent: Nov. 24, 2020

(54) HOLOGRAPHIC METHOD FOR CHARACTERIZING A PARTICLE IN A SAMPLE

(71) Applicants: COMMISSARIAT Á L'ÉNERGIE ATOMIQUE ET AUX ÉNERGIES ALTERNATIVES, Paris (FR); HORIBA ABX SAS, Montpellier (FR); IPRASENSE SAS, Clapiers (FR)

(72) Inventors: Cedric Allier, Grenoble (FR); Anais Ali Cherif, Montpellier (FR); Pierre Blandin, Coublevie (FR); Geoffrey Esteban, Teyran (FR); Lionel Herve, Corenc (FR); Damien Isebe, Grabels (FR)

(73) Assignees: COMMISSARIAT Á L'ÉNERGIE ATOMIQUE ET AUX ÉNERGIES ALTERNATIVES, Paris (FR); HORIBA ABX SAS, Montpellier (FR); IPRASENSE SAS, Clapiers (FR)

( * ) Notice: Subject to any disclaimer, the term of this patent is extended or adjusted under 35 U.S.C. 154(b) by 84 days.

(21) Appl. No.: 16/086,922

(22) PCT Filed: Mar. 22, 2017

(86) PCT No.: PCT/FR2017/050672
§ 371 (c)(1),
(2) Date: Sep. 20, 2018

(87) PCT Pub. No.: WO2017/178723
PCT Pub. Date: Oct. 19, 2017

(65) Prior Publication Data
US 2019/0101482 A1 Apr. 4, 2019

(30) Foreign Application Priority Data
Mar. 23, 2016 (FR) ..................... 16 52501

(51) Int. Cl.
*G01N 15/02* (2006.01)
*G03H 1/08* (2006.01)
(Continued)

(52) U.S. Cl.
CPC ..... *G01N 15/0205* (2013.01); *G01N 15/1429* (2013.01); *G01N 15/1434* (2013.01);
(Continued)

(58) Field of Classification Search
CPC .......... G01N 15/0205; G01N 15/1429; G01N 15/1434; G01N 15/1463; G01N 21/453;
(Continued)

(56) References Cited

U.S. PATENT DOCUMENTS

2014/0327944 A1  11/2014  Naidoo et al.
2014/0365161 A1  12/2014  Naidoo et al.
(Continued)

FOREIGN PATENT DOCUMENTS

WO  WO 2016/024027 A1  2/2016
WO  WO 2016/151248 A1  9/2016

OTHER PUBLICATIONS

Denis, L. et al. "Numerical suppression of the twin image in in-line holography of a volume of micro-objects". Measurement Sciences and Technology, vol. 19, No. 7, May 23, 2008, pp. 1-10. (Year: 2008).*
(Continued)

Primary Examiner — Michael A Lyons
(74) Attorney, Agent, or Firm — Oblon, McClelland, Maier & Neustadt, L.L.P.

(57) ABSTRACT

A method for holographic characterization of a particle contained in a sample, based on an image, or hologram, of the sample obtained by an image sensor when the sample is illuminated by a light source. The hologram is the subject of a holographic reconstruction, to obtain a reference complex
(Continued)

image, representative of the light wave transmitted by the sample in a reconstruction plane. A holographic propagation operator is applied to the reference complex image, to obtain a plurality of secondary complex images, from which a profile is determined describing the change in an optical feature of the light wave transmuted by the sample along the axis of propagation of the light wave.

14 Claims, 8 Drawing Sheets

(51) Int. Cl.
*G01N 15/14* (2006.01)
*G01N 21/45* (2006.01)
*G03H 1/04* (2006.01)
*G03H 1/00* (2006.01)
*G01N 15/10* (2006.01)

(52) U.S. Cl.
CPC ....... *G01N 15/1463* (2013.01); *G01N 21/453* (2013.01); *G03H 1/0866* (2013.01); *G01N 2015/0233* (2013.01); *G01N 2015/1006* (2013.01); *G01N 2015/144* (2013.01); *G01N 2015/1454* (2013.01); *G03H 1/0443* (2013.01); *G03H 2001/0033* (2013.01); *G03H 2001/0447* (2013.01); *G03H 2001/0816* (2013.01); *G03H 2001/0883* (2013.01)

(58) Field of Classification Search
CPC ... G01N 2015/0233; G01N 2015/1006; G01N 2016/144; G01N 2015/1454; G03H 1/0443; G03H 1/0866; G03H 2001/0033; G03H 2001/0447; G03H 2001/0816; G03H 2001/0883
See application file for complete search history.

(56) References Cited

U.S. PATENT DOCUMENTS

| | | | |
|---|---|---|---|
| 2016/0320284 A1* | 11/2016 | Spriggs | G01N 15/0211 |
| 2017/0309036 A1* | 10/2017 | Perraut | G06T 15/10 |
| 2018/0080760 A1* | 3/2018 | Allier | G01N 15/1429 |
| 2018/0113064 A1* | 4/2018 | Allier | C12M 41/46 |
| 2019/0101484 A1* | 4/2019 | Herve | G01N 15/1434 |

OTHER PUBLICATIONS

International Search Report dated Jun. 23, 2017, in PCT/FR2017/050672 filed Mar. 22, 2017.
Langehanenberg, P. et al., "Autofocusing in Digital Holographic Microscopy", 3D RESEARCH, vol. 2, No. 1, 2011, 11 pages, XP055053319.
Poher, V. et al., "Lensfree in-line holographic detection of bacteria", SPIE. vol. 8086, 2011, pp. 808619-1-808619-7, XP040561081.
Wu, N. et al., "Three-Dimensional Identification of Microorganisms Using a Digital Holographic Microscope", Computational and Mathmatical Methods in Medicine, vol. 220, No. 4598. 2013. pp. 671-676.

* cited by examiner

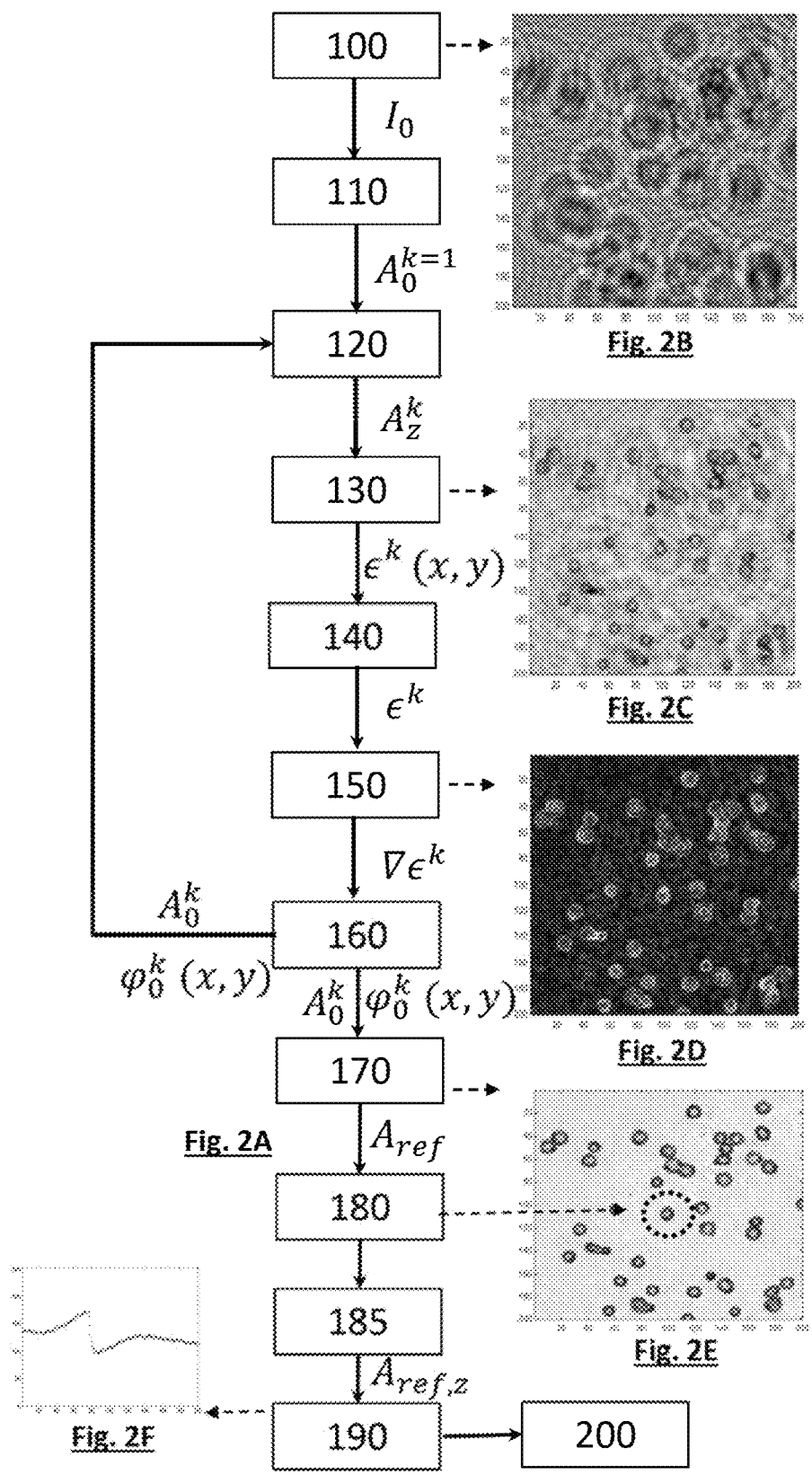

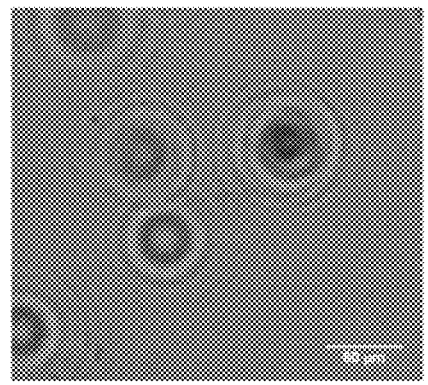
Fig. 5A
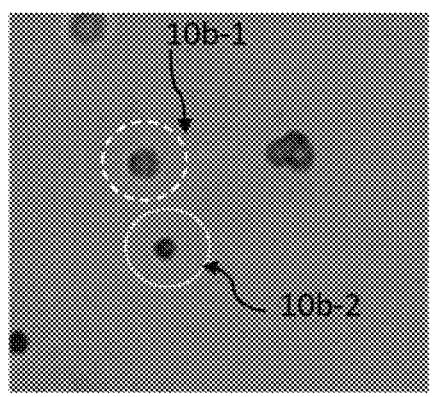
Fig. 5B
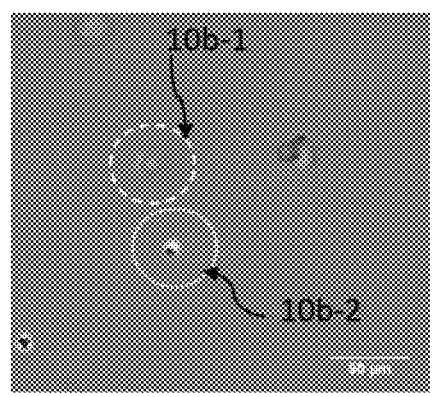
Fig. 5C
Fig. 5D
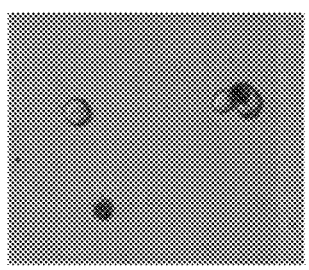
Fig. 5H
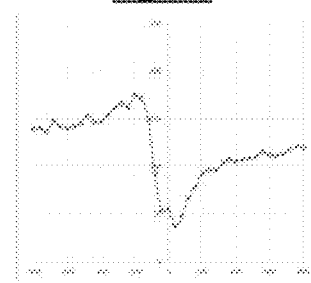
Fig. 5F
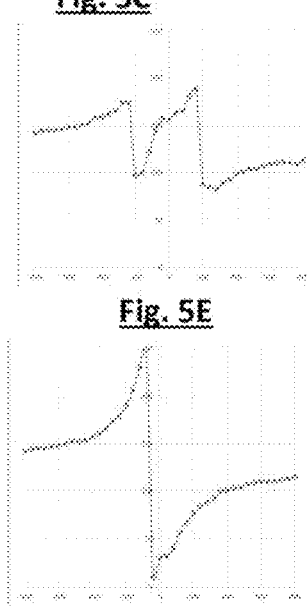
Fig. 5E
Fig. 5G

HOLOGRAPHIC METHOD FOR CHARACTERIZING A PARTICLE IN A SAMPLE

TECHNICAL FIELD

The technical field of the invention relates to the characterization of particles present in a sample, in particular a biological sample, by holographic reconstruction.

PRIOR ART

The observation of samples, and in particular biological samples, by lensless imaging has undergone significant advances in the last ten years. This technique allows a sample to be observed by positioning it between a light source and an image sensor, without positioning an optical magnifying lens between the sample and the image sensor. The image sensor thus collects an image of the light wave that is transmitted by the sample.

This image, also called a hologram, is formed of interference patterns between the light wave emitted by the light source and transmitted by the sample and diffraction waves resulting from the diffraction, by the sample, of the light wave emitted by the light source. These interference patterns are sometimes referred to using the term "diffraction patterns".

The document WO2008090330 describes a device allowing biological particles, in this instance cells, to be observed by lensless imaging. The device makes it possible to associate, with each cell, an interference pattern whose morphology makes it possible to identify the type of cell. Lensless imaging thus appears to be a simple and inexpensive alternative to a conventional microscope. Moreover, its field of observation is significantly larger than is possible for that of a microscope. It is then understood that the application prospects linked to this technology are huge.

Patent application WO2015011096 describes a method allowing the state of a cell to be estimated on the basis of a hologram. This application makes it possible for example to discriminate living cells from dead cells.

The publications Langehanenberg P. "Autofocusing in digital holographic microscopy", 3D Research, vol. 2 No. Mar. 1, 2011, and Poher V. "Lensfree in-line holographic detection of bacteria", SPIE vol. 8086 May 22, 2011 describe methods for locating particles based on the application of digital focusing algorithms. The publication Ning W. "Three-dimensional identification of microorganisms using a digital holographic microscope", Computational and Mathematical Methods in Medicine, vol. 220, No. 4598, Jan. 1, 2013, describes a method allowing a particle to be identified on the basis of a three-dimensional filter applied to reconstructed particle images.

In general, the hologram acquired by the image sensor may be processed by a holographic reconstruction algorithm, so as to estimate optical properties of the sample, for example a transmission factor or a phase. Such algorithms are well known in the field of holographic reconstruction. To this end, the distance between the sample and the image sensor being known, a propagation algorithm is applied, taking into account this distance, as well as the wavelength of the light wave emitted by the light source. It is then possible to reconstruct an image of an optical property of the sample. The reconstructed image may, in particular, be a complex image of the light wave transmitted by the sample, including information on the optical absorption or phase-variation properties of the sample. An example of a holographic reconstruction algorithm is described in the publication Ryle et al., "Digital in-line holography of biological specimens", Proc. Of SPIE Vol. 6311 (2006).

However, holographic reconstruction algorithms may result in reconstruction noise in the reconstructed image, referred to by the term "twin image". This is primarily due to the fact that the image formed on the image sensor does not include information relating to the phase of the light wave reaching this sensor. The holographic reconstruction is therefore produced on the basis of partial optical information, based solely on the intensity of the light wave collected on the image sensor. Improving the quality of the holographic reconstruction is the object of considerable research, implementing so-called "phase retrieval" algorithms, making it possible to estimate the phase of the light wave to which the image sensor is exposed.

The application US2012/0218379 describes for example a method allowing a complex image of a sample to be reconstructed, said complex image including amplitude and phase information. Such an image makes it possible to obtain certain types of information allowing a cell to be identified. The application US2012/0148141 applies the method described in the application US2012/0218379 to reconstruct a complex image of spermatozoa and to characterize their mobility, their orientation or certain geometric parameters, for example the size of their flagella. The application WO2014/012031 also describes the application of a method for reconstructing a complex image of cells, in this instance spermatozoa. This document also describes the acquisition of successive holograms, each hologram being subjected to holographic reconstruction so as to obtain three-dimensional tracking of the trajectory of the spermatozoa.

The inventors have deemed that using a complex image, obtained by holographic reconstruction on the basis of a hologram, does not allow sufficient characterization of a sample, in particular when the sample includes particles dispersed in a medium. The invention allows this problem to be solved and allows particles to be precisely characterized, and may be implemented on the basis of a single acquired image.

DISCLOSURE OF THE INVENTION

One subject of the invention is a method for characterizing a particle contained in a sample, including the following steps;

a) illuminating the sample using a light source, the light source emitting an incident light wave propagating towards the sample along a propagation axis;

b) acquiring, using an image sensor, an image of the sample, formed in a detection plane, the sample being positioned between the light source and the image sensor, each image being representative of a light wave transmitted by the sample under the effect of said illumination;

the method being characterized in that it also comprises the following steps:

c) applying a propagation operator to the image acquired in step b), so as to calculate a complex image, referred to as a reference image, representative of the sample in a reconstruction plane;

d) selecting a radial position of said particle in a plane parallel to the detection plane;

e) from the complex image calculated in step c), determining at least one characteristic quantity of the light wave transmitted by the sample, at a plurality of distances from the detection plane or from the reconstruction plane;

f) forming a profile representing the variation in the characteristic quantity determined in step e) along an axis parallel to the propagation axis and passing through the radial position selected in step d);

g) characterizing the particle depending on the profile formed in step f).

Preferably, step e) comprises;

applying a propagation operator to the reference complex image, so as to calculate what are called secondary complex images for a plurality of distances from the reconstruction plane or from the detection plane;

determining characteristic quantities of the light wave to which the image sensor is exposed, i.e. the light wave transmitted by the sample, at each of said distances, from the secondary complex images.

Each characteristic quantity may be determined by determining the modulus or the argument of a secondary complex image calculated in step e).

The word "one" or "a" is understood to mean "at least one".

According to one embodiment, the characterization is performed by comparing the profile formed in step f) with standard profiles determined in a learning phase. This learning phase consists in implementing steps a) to f) by using a standard sample instead of the sample to be characterized.

In step d), the radial position of each particle can be selected using the image acquired in step b) or using the reference complex image calculated in step c).

According to one embodiment, no magnifying optics are placed between the sample and the image sensor.

Preferably, the reconstruction plane, in which the reference image is calculated, is a plane along which the sample extends, referred to as the plane of the sample.

The light source may be a laser diode or a light-emitting diode.

According to one embodiment, in step c), the calculation of the reference complex image includes the following substeps:

i) defining an initial image of the sample in the detection plane, from the image acquired by the image sensor;

ii) determining a complex image of the sample in a reconstruction plane by applying a propagation operator to the initial image of the sample defined in substep i) or to the image of the sample in the detection plane resulting from the preceding iteration;

iii) calculating a noise indicator from the complex image determined in substep ii), this noise indicator depending, preferably according to an increasing or decreasing function, on a reconstruction noise affecting said complex image;

iv) updating the image of the sample in the detection plane by adjusting phase values of the pixels of said image, the adjustment being carried out according to a variation in the indicator calculated in substep iii) according to said phase values;

v) reiterating substeps ii) to iv) until a convergence criterion is reached, in such a way as to obtain a complex reference image of the sample in the detection plane, or in the reconstruction plane.

According to one embodiment, substep iii) includes:

for various pixels, calculating a quantity associated with each pixel, according to the value of the complex image determined in substep ii) for said pixel, or of a dimensional derivative of said complex image for said pixel;

combining the calculated quantities with various pixels, so as to obtain a noise indicator.

The noise indicator may be a norm of order lower than or equal to 1 calculated from the quantities associated with each pixel. The noise indicator quantifies the reconstruction noise affecting the complex image.

The quantity associated with each pixel may be calculated from the modulus of a dimensional derivative, for said pixel, of the complex image determined in substep ii).

It may be obtained from a dimensional derivative of the complex image, this derivative being calculated at multiple pixels of the image, or even at each pixel of the image, it may also be obtained from the value of the complex image at multiple pixels of the image, or even at each pixel of the image.

According to one embodiment, in substep i), the initial image of the sample is defined by a normalization of the image acquired by the image sensor by an image representative of the light wave emitted by the light source:

in substep iii), the quantity associated with each pixel is calculated according to the value of the complex image determined in substep ii), for said pixel, subtracted from a strictly positive number, for example the number 1.

The method may comprise any one of the following features, taken alone or in combination:

in substep iii), the indicator is a sum, optionally a weighted sum, of the quantity associated with each pixel of the complex image determined in substep it);

in substep iv), the value of the phase of each pixel is adjusted by forming a vector, referred to as the phase vector, each term of which corresponds to the value of the phase of a pixel of the image of the sample in the detection plane, this vector being updated, in each iteration, so as to minimize or to maximize the noise indicator calculated in substep iii), on the basis of a gradient of the noise indicator according to each term of said phase vector.

According to one embodiment, in step d), a plurality of radial coordinates that are representative of one and the same particle are selected, and, in step f), a number of profiles that is equal to the number of selected coordinates is formed. Step f) may then comprise a combination of these profiles, for example a mean of these profiles.

The particle may be a cell, a microorganism, a microbead, an exosome or a droplet of an emulsion. It may also be a cell nucleus, a piece of cellular debris or a cell organelle. The term "characterization" is understood to mean in particular:

a determination of the nature of a particle, i.e. a classification of this particle according to one or more predetermined classes;

a determination of the state of the particle according to one or more predetermined states;

an estimation of the size of a particle, or of its shape, of its volume or any other geometric parameter;

an estimation of an optical property of one or more particles, for example the refractive index or an optical transmission property;

a count of said particles according to their characterization.

Another subject of the invention is a device for observing a sample, including:

a light source capable of emitting an incident light wave propagating towards the sample;

a holder, configured to hold the sample between said light source and an image sensor;

a processor, configured to receive an image of the sample acquired by the image sensor and to implement the method described in this application, and more particularly steps c) to f) or c) to g) mentioned above.

Other advantages and features will become more clearly apparent from the following description of particular embodiments of the invention, which are given by way of non-limiting examples and shown in the figures listed below.

FIGURES

FIG. 2A illustrates the main steps of a method allowing a complex image of a sample to be calculated in a reconstruction plane.

FIGS. 2B, 2C, 2D, 2E et 2F respectively show:

a hologram acquired by the image sensor;

an image reconstructed in a reconstruction plane in a first iteration of the method shown in FIG. 2A;

an image showing a quantity associated with each pixel of the image shown in FIG. 2C;

a representation of an image, called the reference complex image, reconstructed after a plurality of iterations of the method shown in FIG. 2A;

a profile obtained on the basis of secondary complex images formed from the reference complex image.

Figure 3A:
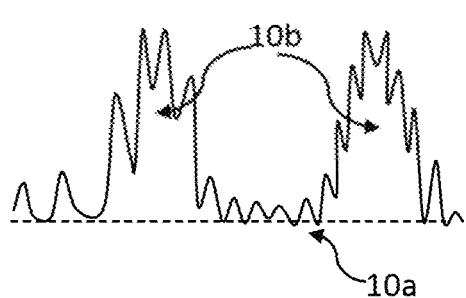
Figure 3B:
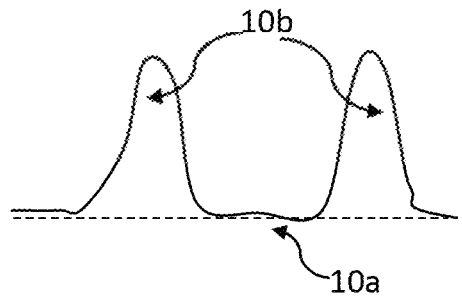

FIGS. 3A and 3B schematically show a radial profile of the modulus or of the phase of a complex image obtained by holographic reconstruction, respectively with and without reconstruction noise.

Figure 4:
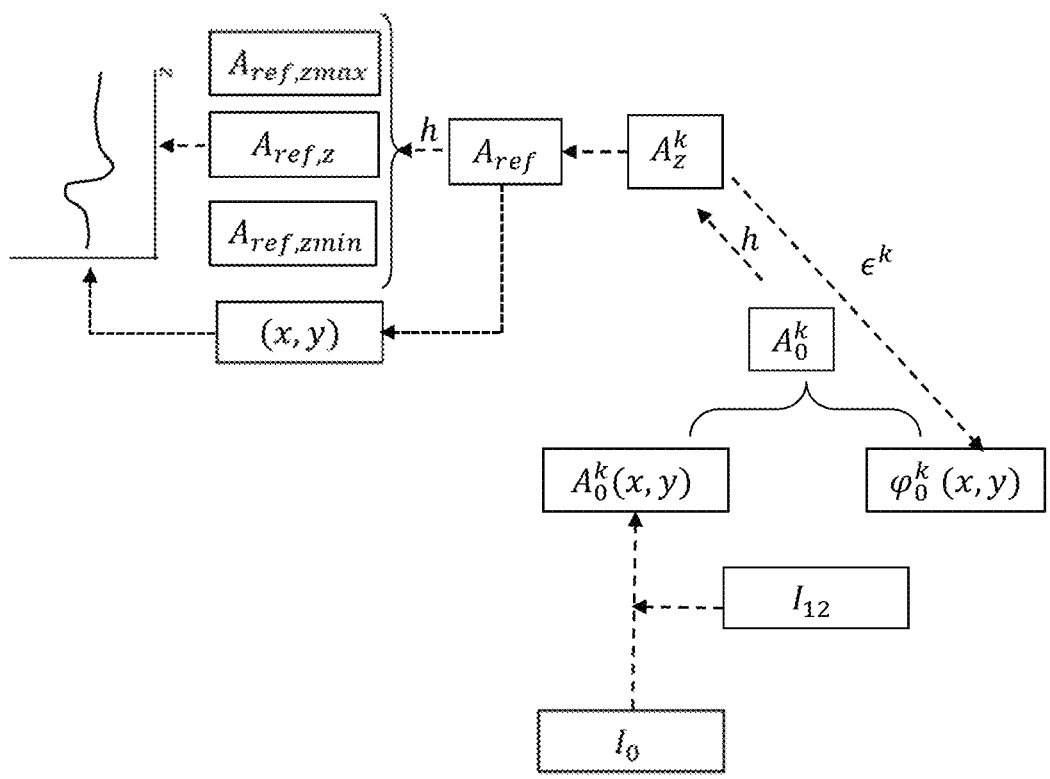

FIG. 4 summarizes the operation of a method implementing the invention.

FIG. 5A is a hologram acquired by an image sensor, the sample including cells dispersed in an aqueous solution. FIGS. 5B and 5C respectively show the modulus and the phase of a complex image, called a reference image, this complex image being formed in a reconstruction plane. FIGS. 5D and 5E are profiles respectively showing a variation in the modulus and phase of the light wave to which the image sensor is exposed, along a propagation axis passing through a first cell. FIGS. 5F and 5G are profiles respectively showing a variation in the modulus and phase of the light wave to which the image sensor is exposed, along a propagation axis passing through a second cell. FIG. 5H is a microscope image of the observed sample.

Figure 6A:
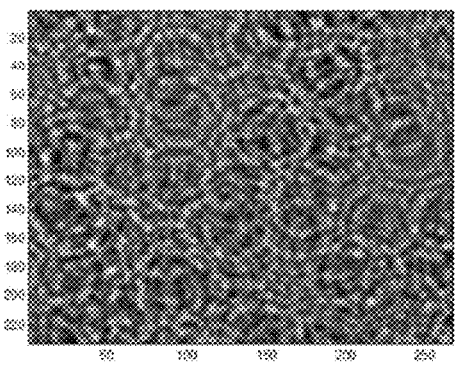
Figure 6B:
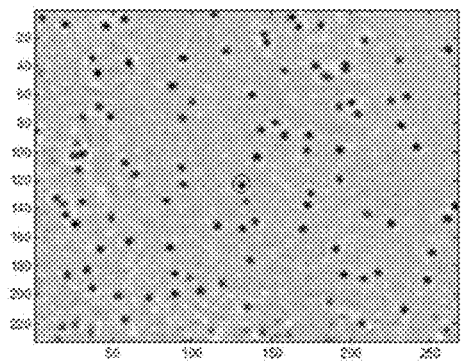
Figure 6C:
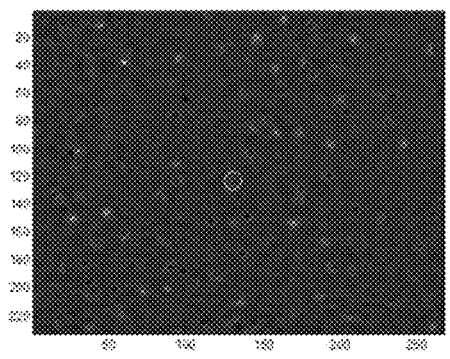
Figure 6D:
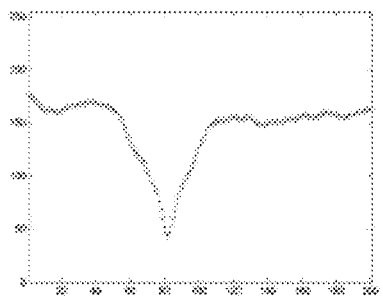
Figure 6E:
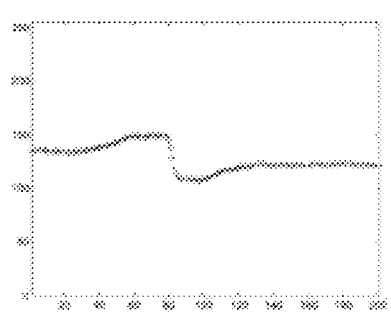

FIG. 6A is a hologram acquired by an image sensor, the sample including red blood cells dispersed in an aqueous solution. FIGS. 6B and 6C respectively show the modulus and the phase of a complex image, called a reference image, this complex image being formed in a reconstruction plane. FIGS. 6D and 6E are profiles respectively showing a variation in the modulus and in the phase of the light wave to which the image sensor is exposed, along a propagation axis passing through a red blood cell.

Figure 7A:
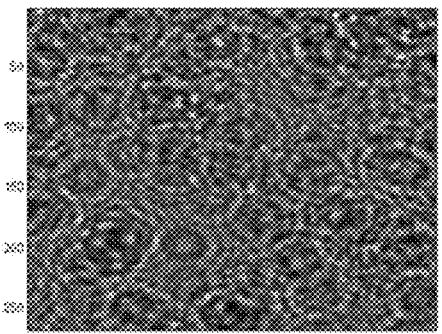
Figure 7B:
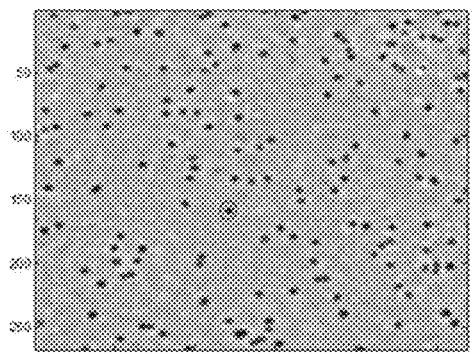
Figure 7C:
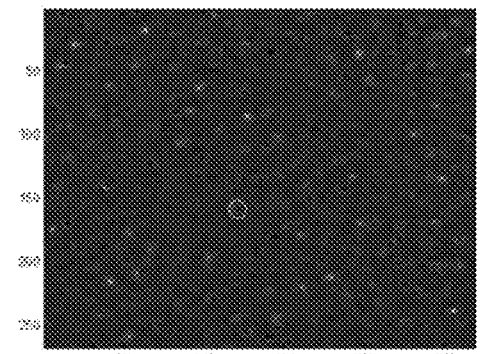
Figure 7D:
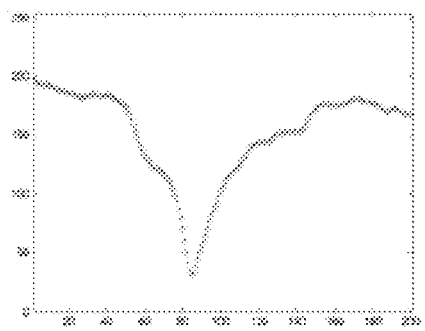
Figure 7E:
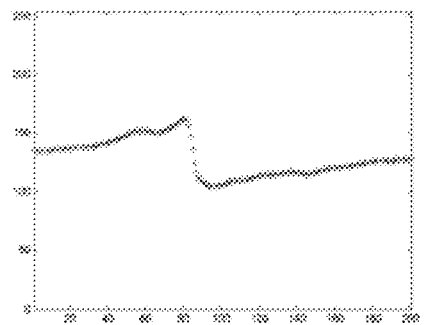

FIG. 7A is a hologram acquired by an image sensor, the sample including red blood cells dispersed in an aqueous solution. FIGS. 7B and 7C respectively show the modulus and the phase of a complex image, called a reference image, this complex image being formed in a reconstruction plane. FIGS. 7D and 7E are profiles respectively showing a variation in the modulus and in the phase of the light wave to which the image sensor is exposed, along a propagation axis passing through a red blood cell.

Figure 8A:
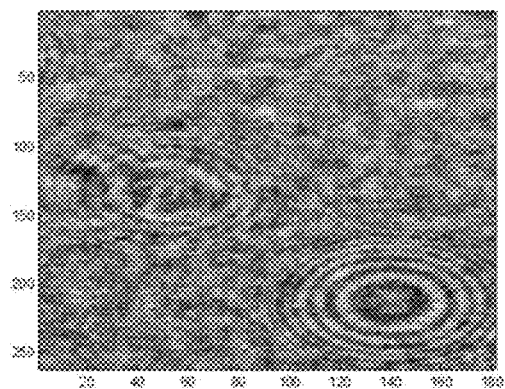
Figure 8B:
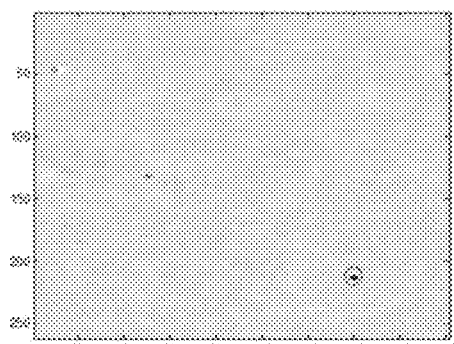
Figure 8C:
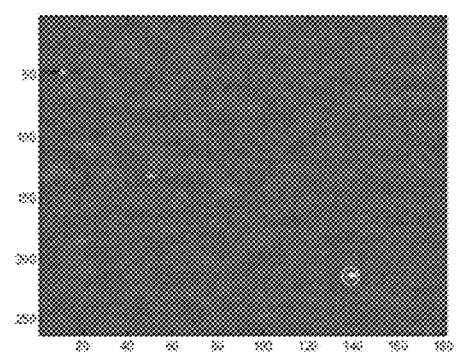
Figure 8D:
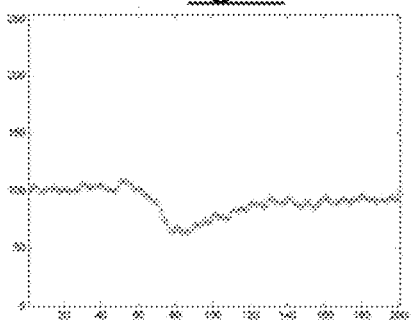
Figure 8F:
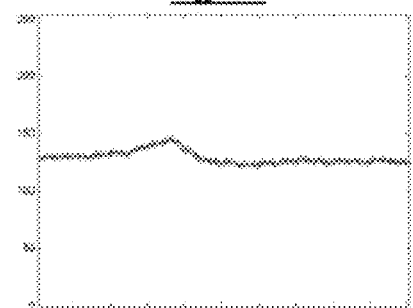
Figure 8E:
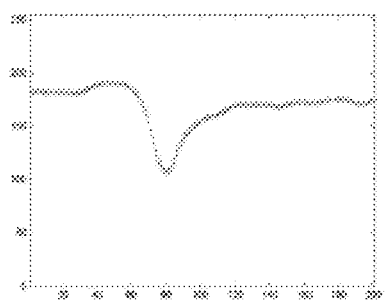
Figure 8G:
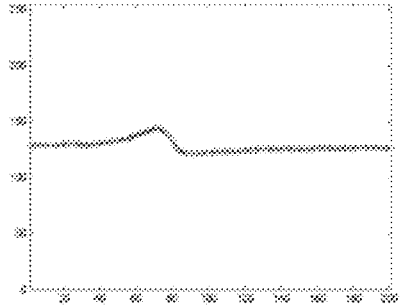

FIG. 8A is a hologram acquired by an image sensor, the sample being an emulsion including droplets of oils dispersed in an aqueous solution. FIGS. 8B and 8C respectively show the modulus and the phase of a complex image, called a reference image, this complex image being formed in a reconstruction plane. FIGS. 8D and 8F are profiles respectively showing a variation in the modulus and of the phase of the light wave to which the image sensor is exposed, along a propagation axis passing through a droplet, these profiles being obtained directly from secondary complex images calculated by applying a propagation operator to the hologram of FIG. 8A. FIGS. 8E and 8G are profiles respectively showing a variation in the modulus and of the phase of the light wave to which the image sensor is exposed, along a propagation axis passing through a droplet, these profiles being obtained from secondary complex images calculated by applying a propagation operator to the reference complex image, the modulus and the phase of which are shown in FIGS. 8B and 8C.

Figure 9A:
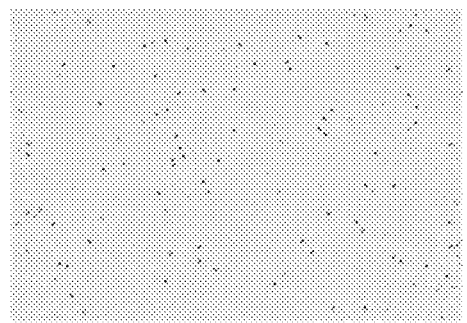
Figure 9B:
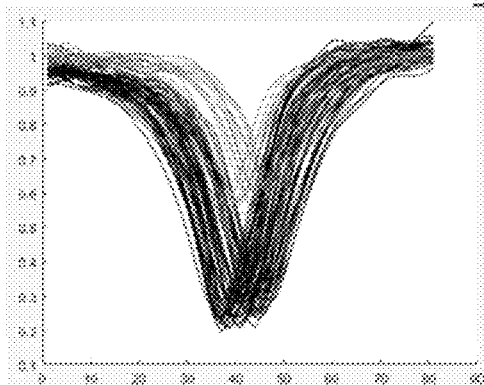
Figure 9C:
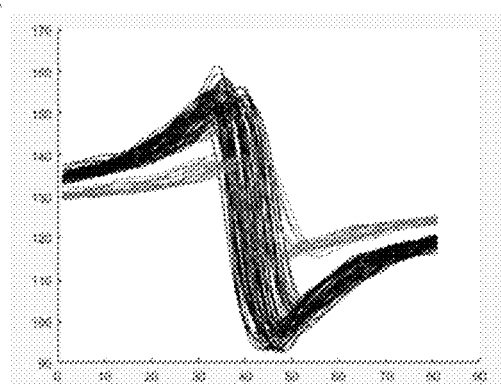
Figure 9D:
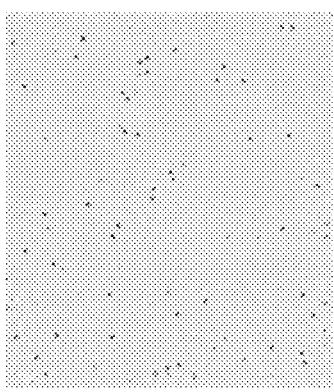
Figure 9E:
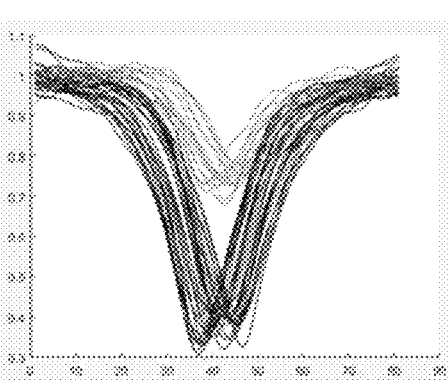
Figure 9F:
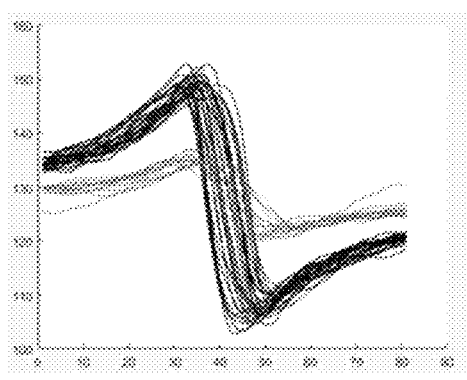

FIG. 9A shows a complex image of latex beads of various volumes suspended in a liquid. FIGS. 9B and 9C respectively show profiles of the modulus and of the phase of the complex amplitude passing through beads shown in FIG. 9A. FIG. 9D shows a complex image of latex beads of various volumes suspended in a liquid. FIGS. 9E and 9F respectively show profiles of the modulus and of the phase of the complex amplitude passing through beads shown in FIG. 9D.

DISCLOSURE OF PARTICULAR EMBODIMENTS

Figure 1:
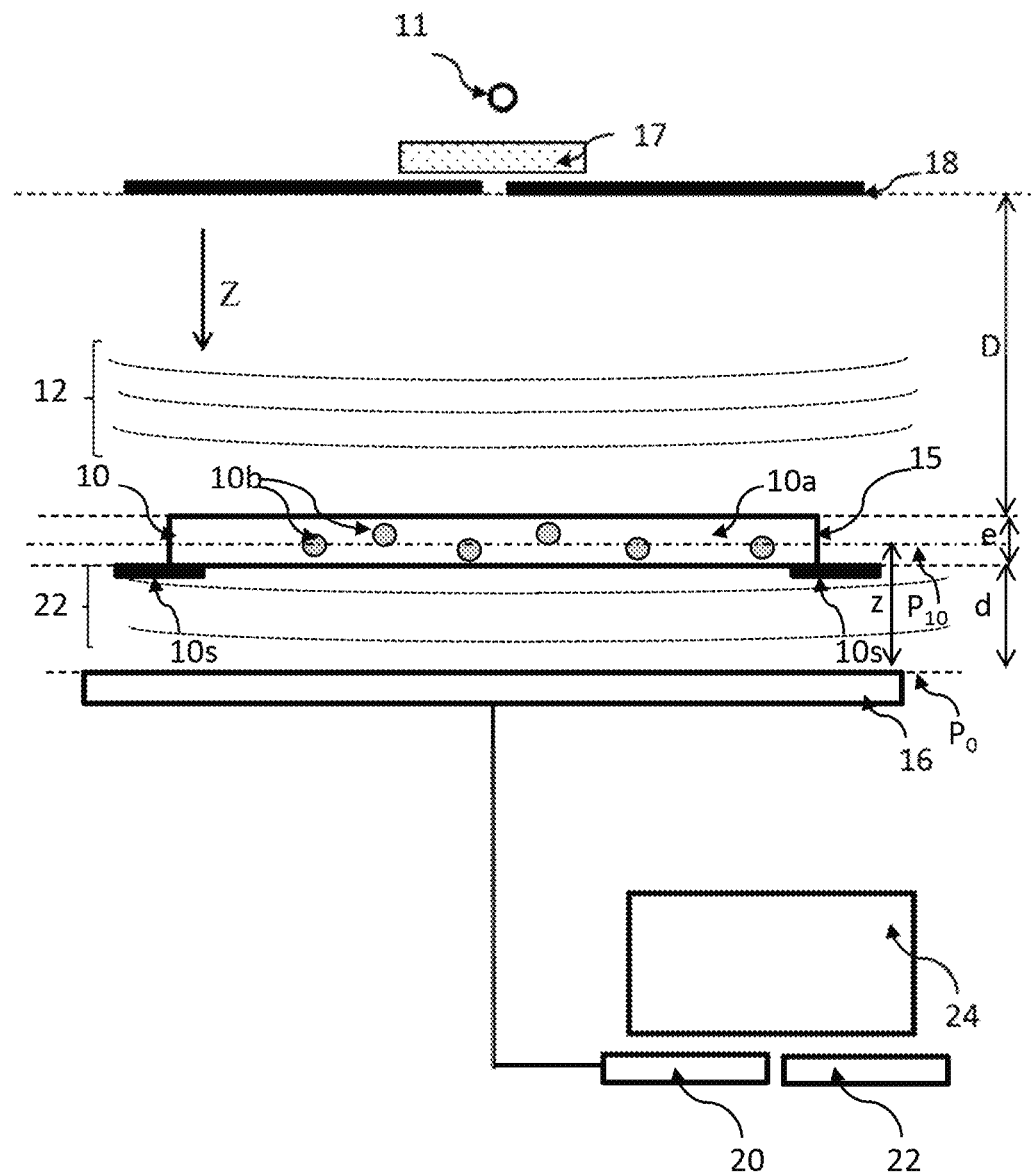
FIG. 1 shows an exemplary device according to the invention.

FIG. 1 shows an exemplary device according to the invention. A light source 11 is capable of emitting a light wave 12, referred to as the incident light wave, propagating in the direction of a sample 10, along a propagation axis Z. The light wave is emitted in a spectral band $\Delta\lambda$, including a wavelength $\lambda$. This wavelength may be a central wavelength of said spectral band.

The sample 10 is a sample that it is desired to characterize. It may in particular be a medium 10a including particles 10b. The particles 10b may be blood particles, for example red blood cells. They may also be cells, parasites, microorganisms, for example bacteria or yeasts, microalgae, microbeads or insoluble droplets in a liquid medium, for example lipid nanoparticles. They may also be cell nuclei, organelles or cellular debris. Preferably, the particles 10b have a diameter, or are inscribed within a diameter, smaller than 1 mm, and preferably smaller than 100 µm. They are microparticles (diameter smaller than 1 mm) or nanoparticles (diameter smaller than 1 µm). The medium 10a, in which the particles are suspended, may be a liquid medium, for example a bodily fluid, a culture medium or a liquid taken from the environment or from an industrial process. It may be a solid medium or be gel-like in consistency, for example an agar-like substrate suitable for the growth of colonies of bacteria. It may also be an evaporated, set or frozen sample.

The sample 10 is, in this example, contained within a fluid chamber 15. The fluid chamber 15 is for example a microcuvette, commonly used in point-of-care devices, into which the sample 20 penetrates, for example by capillary action. The thickness e of the sample 10, along the propagation axis, varies typically between 10 µm and 1 cm, and is preferably comprised between 20 µm and 500 µm, for example 150 µm.

The sample extends along a plane $P_{10}$, referred to as the sample plane, perpendicular to the propagation axis. It is held on a holder 10s.

The distance D between the light source 11 and the sample 10 is preferably larger than 1 cm. It is preferably comprised between 2 and 30 cm. Preferably, the light source, seen by the sample, may be considered to be point-like. This means that its diameter (or its diagonal) is preferably smaller than one tenth, and better still one hundredth, of the distance between the sample and the light source. Thus, the light preferably reaches the sample in the form of planar waves, or waves that may be considered as such.

The light source 11 may be a laser diode or a light-emitting diode. It may be associated with a diaphragm 18 or spatial filter. The aperture of the diaphragm is typically comprised between 5 µm and 1 mm and preferably between 50 µm and 500 µm. In this example, the diaphragm is provided by Thorlabs under the reference P150S and it is 150 µm in diameter. The diaphragm may be replaced by an optical fiber, a first end of which is placed facing the light source 11, and a second end of which is placed facing the sample 10.

The device may include a scatterer 17, placed between the light source 11 and the diaphragm 18. Using such a scatterer makes it possible to avoid the constraints of centering the light source 11 with respect to the aperture of the diaphragm 18. The function of such a scatterer is to distribute the light beam, produced by an elementary light source $11_i$, ($1 \leq i \leq 3$) in a cone of angle $\alpha$. Preferably, the scattering angle $\alpha$ varies between 10° and 80°.

Preferably, the width of the spectral emission band $\Delta\lambda$ of the incident light wave 12 is less than 100 nm. The term "spectral bandwidth" is understood to mean the full width at half maximum of said spectral band.

The sample 10 is placed between the light source 11 and an image sensor 16. The latter preferably extends in parallel, or substantially in parallel, to the plane along which the sample extends. The term "substantially in parallel" means that the two elements may not be rigorously parallel, an angular tolerance of a few degrees, smaller than 20° or 10° being acceptable.

The image sensor 16 is able to form an image in a detection plane $P_0$. In the example shown, this is an image sensor including a matrix-array of pixels, of CCD type or a CMOS. CMOS sensors are preferred because the size of the pixels is smaller, this allowing images, the spatial resolution of which is more favorable, to be acquired. The detection plane $P_0$ preferably extends perpendicular to the propagation axis Z of the incident light wave 12.

The distance d between the sample 10 and the matrix-array of pixels of the image sensor 16 is preferably comprised between 50 µm and 2 cm, preferably comprised between 100 µm and 2 mm.

The absence of a magnifying optic between the image sensor 16 and the sample 10 will be noted. This does not rule out the possible presence of focussing microlenses at each pixel of the image sensor 16, these microlenses not having a function for magnifying the image acquired by the image sensor.

Under the effect of the incident light wave 12, the sample 10 may create a diffracted wave that is liable, in the detection plane $P_0$, to produce interference, in particular with a portion of the incident light wave 12 transmitted by the sample. Furthermore, the sample may absorb a portion of the incident light wave 12. Thus, the light wave 22, transmitted by the sample, and to which the image sensor 20 is exposed, may comprise:
- a component resulting from the diffraction of the incident light wave 12 by the sample;
- a component resulting from the absorption of the incident light wave 12 by the sample. This component corresponds to a portion of the incident light wave 12 that is not absorbed by the sample.

The light wave 22 may also be referred to by the term "exposure light wave". A processor 20, for example a microprocessor, is able to process each image acquired by the image sensor 16. In particular, the processor is a microprocessor linked to a programmable memory 22 in which there is stored a sequence of instructions for performing the image processing and computing operations described in this description. The processor may be coupled to a screen 24 allowing images acquired by the image sensor 16 or calculated by the processor 20 to be displayed.

An image acquired on the image sensor 16, also referred to as a hologram, does not allow a sufficiently accurate representation of the observed sample to be obtained. As described in conjunction with the prior art, it is possible to apply, to each image acquired by the image sensor, a propagation operator h, so as to calculate a quantity representative of the light wave 22 transmitted by the sample 10, and to which the image sensor 16 is exposed. Such a method, referred to by the term "holographic reconstruction", makes it possible in particular to reconstruct an image of the modulus or of the phase of this light wave 22 in a reconstruction plane parallel to the detection plane $P_0$, and in particular in the plane $P_{10}$ along which the sample extends. To achieve this, a convolution product of the image $I_0$ acquired by the image sensor 16 by a propagation operator h is determined. It is then possible to reconstruct a complex expression A for the light wave 22 at any point of spatial coordinates (x, y, z), and in particular in a reconstruction plane $P_z$ located a distance |z| from the image sensor 16, this reconstruction plane potentially being the plane of the sample $P_{10}$. The complex expression A is a complex quantity, the argument and the modulus of which are respectively representative of the phase and of the intensity of the light wave 22 to which the image sensor 16 is exposed. The convolution product of the image $I_0$ by the propagation operator h makes it possible to obtain a complex image $A_z$ representing a spatial distribution of the complex expression A in a plane, referred to as the reconstruction plane $P_z$, extending to a coordinate z of the detection plane $P_0$. In this example, the equation for the detection plane $P_0$ is z=0. This complex image corresponds to a complex image of the sample in the reconstruction plane $P_z$. It also represents a two-dimensional spatial distribution of the optical properties of the wave 22 to which the image sensor 16 is exposed.

The role of the propagation operator h is to describe the propagation of the Sight between the image sensor 16 and a point of coordinates (x, y, z), located at a distance |z| from the latter. It is then possible to determine the modulus M(x, y, z) and/or the phase $\varphi$(x, y, z) of the light wave 22 at this distance |z|, which is called the reconstruction distance, where:

$$M(x, y, z) = \text{abs}[A(x, y, z)] \quad (1)$$

$$\varphi(x, y, z) = \arg[A(x, y, z)] \quad (2)$$

The operators abs and arg denote the modulus and argument, respectively,

Stated otherwise, the complex expression A for the light wave 22 at any point of coordinates (x, y, z) in space is such that:

$$A(x, y, z) = M(x, y, z) e^{j\varphi(x, y, z)} \quad (3)$$

The practice of obtaining a complex image $A_z$ of the sample by applying a propagation operator to a hologram is known from the prior art, in particular for the purpose of particle characterization, as evidenced by the references provided in conjunction with the prior art.

However, the inventors have deemed that a complex image of the sample, including particles, does not allow a sufficiently reliable characterization of said particles to be performed. An important point of the invention is that a particle is characterized not by a complex image, but by a profile of an optical characteristic of the light wave 22 along its propagation axis Z. The term "profile" is understood to mean a variation of a quantity along an axis, and in particular along the propagation axis, in which case the profile along the axis Z is spoken of. The optical characteristic may be a phase, an amplitude or a combination of a phase and amplitude. In general, an optical characteristic is obtained from the complex expression A such as defined above.

However, such a reconstruction may be accompanied by reconstruction noise, which may be substantial, due to the fact that the propagation is carried out on the basis of a hologram $I_0$ that does not include information relating to the phase. Thus, before the profile is established, it is preferable to obtain information relating to the phase of the light wave 22 to which the image sensor 16 is exposed. This phase-related information may be obtained by reconstructing a complex image $A_z$ of the sample 10, using methods described in the prior art, so as to obtain an estimation of the amplitude and phase of the light wave 22 in the plane $P_0$ of the image sensor or in a reconstruction plane $P_z$ located at a distance $|z|$ from the latter. However, the inventors have developed a method based on the calculation of a reference complex image, which method is described with reference to FIG. 2A. This method comprises the following stages:

Acquiring an image $I_0$ with the image sensor 16, this image forming the hologram (step 100).

Calculating a complex image called the reference image $A_{ref}$ of the sample 10 in a reconstruction plane $P_z$ or in the detection plane $P_0$, this reference complex image including information on the phase and amplitude of the light wave 22 to which the image sensor 16 is exposed: this step is carried out by applying the propagation operator h described above to the acquired image $I_0$ (steps 110 to 170). This image is said to be a reference image because the formation of the profile on the basis of which the particle is characterized is based thereon.

Selecting a radial position (x, y) of a particle in the detection plane (step 180), using either the reference complex image or the hologram.

Applying the propagation operator h to the reference complex image $A_{ref}$ so as to calculate complex images $A_{ref,z}$, called secondary images, along the propagation axis Z (step 185).

On the basis of each secondary complex image $A_{ref,z}$, estimating a characteristic quantity of the light wave 22, at the radial position (x, y) of the particle selected beforehand, and at a plurality of distances from the reconstruction plane (or from the detection plane), and then forming a profile representing a variation in said characteristic quantity along the propagation axis Z (step 190).

Characterizing the particle depending on this profile. This characterization may be achieved by comparing the obtained profile with standard profiles obtained in a calibrating phase, using standard samples The characterization may be based on a metric allowing a comparison between the obtained profile and the standard profiles, or a classification of the obtained profile according to classes associated with standard profiles (step 200).

The algorithm presented in FIG. 2A is detailed below, the results obtained in certain steps being illustrated in FIGS. 2B to 2F. Steps 110 to 170 are a preferred way of obtaining a reference complex image, denoted by $A_{ref}$, this image representing a spatial distribution of the complex expression of the wave 22 in a reconstruction plane $P_z$. Those skilled in the art will understand that other algorithms allowing such a complex image to be reconstructed, and for example the algorithms mentioned with reference to the prior art, can also be envisioned, for example the algorithms described in US2012/0218379 pages 10 to 12.

Step 100: Image Acquisition

In this step, the image sensor 16 acquires an image $I_0$ of the sample 16, and more precisely of the light wave 22 transmitted by the latter, to which light wave the image sensor is exposed. Such an image, or hologram, is shown in FIG. 2B.

This image was produced using a sample 10 including Chinese hamster ovary (CHO) cells immersed in a saline buffer, the sample being contained in a fluidic chamber of 100 µm thickness placed at a distance d of 1500 µm from a CMOS sensor. The sample was illuminated with a light-emitting diode 11 the spectral emission band of which was centered on a wavelength of 450 nm and which was located at a distance D=8 cm from the sample.

Step 110: Initialization

In this step, an initial image $A_0^{k=0}$ of the sample is defined, from the image $I_0$ acquired by the image sensor 16. This step is an initialization of the iterative algorithm described below with reference to steps 120 to 180, the exponent k indicating the rank of each iteration. The modulus $M_0^{k=0}$ of the initial image $A_0^{k=0}$ may be obtained by applying the square-root operator to the image $I_0$ acquired by the image sensor, in which case $M_0^{k=0}=\sqrt{I_0}$. It may also be obtained by normalizing the image $I_0$ by a term representative of the intensity of the light wave 12 incident on the sample 16. The latter may be:

the square root of a mean $\overline{I_0}$ of the image $I_0$, in which case each pixel $I_0(x, y)$ of the acquired image is divided by said mean, such that $$M_0^{k=0} = \sqrt{\frac{I_0(x, y)}{\overline{I_0}}} \qquad (4)$$

a sampleless image $I_{12}$ acquired by the image sensor 16 in the absence of a sample between the light source 11 and the image sensor, in which case the value of each pixel $I_0(x, y)$ of the acquired image of the sample is divided by the value of each pixel $I_{12}(x, y)$ of the sampleless image:

$$M_0^{k=0} = \sqrt{\frac{I_0(x, y)}{I_{12}(x, y)}} \qquad (4')$$

a mean $\overline{I_{12}}$ of said sampleless image, in which case each pixel $I_0(x, y)$ of the acquired image is divided by said mean:

$$M_0^{k=0} = \sqrt{\frac{I_0(x, y)}{\overline{I_{12}}}} \qquad (4'')$$

The phase $\varphi_0^{k=0}$ of the initial image $A_0^{k=0}$ is either considered to be zero in each pixel (x, y), or preset to an arbitrary value. Specifically, the initial image $A_0^{k=0}$ results directly from the image $I_0$ acquired by the image sensor 16. However, the latter includes no information relating to the phase of the light wave 22 transmitted by the sample 10, the image sensor 16 being sensitive only to the intensity of this light wave.

Step 120: Propagation

In this step, the image $A_0^{k-1}$ obtained in the plane of the sample is propagated to a reconstruction plane $P_z$, by applying a propagation operator such as described above, so as to obtain a complex image $A_z^k$, representative of the sample, in the reconstruction plane $P_z$. The term "complex image" refers to the fact that each term for this image is a complex quantity. The propagation is carried out by convoluting the image $A_0^{k-1}$ with the propagation operator $h_{-z}$, such that:

$$A_z^k = A_0^{k-1} * h_{-z} \tag{5}$$

the symbol * representing a convolution product. The index −z represents the fact that the propagation is carried out in a direction opposite to that of the propagation axis Z. Back-propagation is spoken of.

The propagation operator is for example the Fresnel-Helmholtz function, such that:

$$h(x, y, z) = \frac{1}{j\lambda z} e^{j2\pi \frac{z}{\lambda}} \exp\left(j\pi \frac{x^2 + y^2}{\lambda z}\right) \tag{6}$$

The convolution is generally performed in the frequency domain, or it is reduced to a product, in which case the Fourier transform of this operator is used, the latter being:

$$H(\mu, \nu, z) = e^{j2\pi \frac{z}{\lambda}} \exp(-\lambda z(\mu^2 + \nu^2)) \tag{6'}$$

where λ denotes the central wavelength of the spectral emission band of the light source 11.

Thus, $$A_z^k(x, y) = A_z^k(r) = -\frac{1}{j\lambda z} e^{-j2\pi \frac{z}{\lambda}} \int\int A_0^{k-1}(r')\exp-\left(j\pi \frac{(r-r')^2}{\lambda z}\right)dr' \tag{7}$$

where r and r' respectively denote radial coordinates, i.e. in the reconstruction plane $P_z$ and in the detection plane $P_0$.

In the first iteration (k=1), $A_0^{k=0}$ is the initial image determined in step 110. In the following iterations, $A_0^{k-1}$ is the complex image in the detection plane $P_0$ updated in the preceding iteration.

The reconstruction plane $P_z$ is a plane away from the detection plane $P_0$, and preferably parallel to the latter. Preferably, the reconstruction plane $P_z$ is a plane $P_{10}$ in which the sample 10 lies. Specifically, an image reconstructed in this plane allows a generally high spatial resolution to be obtained. It may also be a question of another plane, located a nonzero distance from the detection plane, and preferably parallel to the latter, for example a plane lying between the image sensor 16 and the sample 10.

FIG. 2C shows the modulus of an image $A_z^{k=1}$ reconstructed at a distance of 1440 μm from the detection plane $P_0$ by applying the propagation operator defined above to the hologram of FIG. 2B. This image is the complex image, in the reconstruction plane, established in the first iteration.

Step 130: Calculation of a Quantity in a Plurality of Pixels of the Complex Image $A_z^k$ In this step, a quantity $\epsilon^k(x, y)$ associated with each pixel of a plurality of pixels (x, y) of the complex image $A_z^k$ is calculated, preferably in each of these pixels. This quantity depends on the value $A_z^k(x, y)$ of the image $A_z^k$, or of its modulus, in the pixel (x, y) for which it is calculated. It may also depend on a dimensional derivative of the image in this pixel, for example the modulus of a dimensional derivative of this image.

In this example, the quantity associated with each pixel (x, y) is based on the modulus of a dimensional derivative, such that:

$$\epsilon^k(x, y) = \sqrt{\left|\frac{\partial A_z^k(x, y)}{\partial x}\right|^2 + \left|\frac{\partial A_z^k(x, y)}{\partial y}\right|^2} \tag{8}$$

Since the image is discretized into pixels, the derivative operators may be replaced by Sobel operators, such that:

$$\epsilon^k(x, y) = \tag{9}$$
$$\sqrt{(S_x * A_z^k(x, y))(S_x * A_z^k(x, y))^* + (S_y * A_z^k(x, y))(S_y * A_z^k(x, y))^*}$$

where;
( )* is the complex conjugate operator; and
$S_x$ and $S_y$ are Sobel operators along two orthogonal axes X and Y of the reconstruction plane $P_z$.

In this example, $$S_x = \begin{bmatrix} 1 & 0 & -1 \\ 2 & 0 & -2 \\ 1 & 0 & -1 \end{bmatrix} \tag{10}$$

and $S_y$ is the transposed matrix of $S_x$.

FIG. 2D shows, in the form of an image, the value of the quantity $\epsilon^k(x, y)$ in each pixel of the image $A_z^{k=1}$ shown in FIG. 2C.

Step 140: Establishment of a Noise Indicator Associated With the Image $A_z^k$.

In step 130, quantities $\epsilon^k(x, y)$ were calculated in a plurality of pixels of the complex image $A_z^k$. These quantities may form a vector $E^k$, the terms of which are the quantities $\epsilon^k(x, y)$ associated with each pixel (x, y).

In this step, an indicator, called the noise indicator, is calculated from a norm of the vector $E^k$. Generally, an order is associated with a norm, such that the norm $\|x\|_p$ of order p of a vector x of dimension n of coordinates $(x_1, x_2, \ldots x_n)$ is such that:

$$\|x\|_p = (\Sigma_{i=1}^n |x_i|^p)^{1/p} \tag{12}$$

where p≥0.

In the present case, a norm of order 1 is used, in other words p=1. Specifically, the inventors have estimated that a norm of order 1, or of order lower than or equal to 1, is particularly suitable for this algorithm, for reasons explained below in conjunction with FIGS. 3A and 3B.

In this step, the quantity $\epsilon^k(x, y)$ calculated from the complex image $A_z^k$, in each pixel (x, y) of the latter, is summed so as to form a noise indicator $\epsilon^k$ associated with the complex image $A_z^k$.

Thus, $$\epsilon^k = \Sigma_{(x, y)} \epsilon^k(x, y) \tag{15}$$

This noise indicator $\epsilon^k$ corresponds to a norm of the total variation in the complex image $A_z^k$.

With reference to the example of FIG. 2D, the noise indicator $\epsilon^{k=1}$ is obtained, in the first iteration, by summing the value of the pixels of this image.

As an alternative to a norm of order 1, a weighted sum of the quantities $\varepsilon^k(x, y)$, or another arithmetic combination, is also envisionable.

Because a norm of order 1, or of order lower than or equal to 1, is used, the value of the noise indicator $\varepsilon^k$ decreases as the complex image $A_z^k$ becomes more and more representative of the sample. Specifically, in the first iterations, the value of the phase $\varphi_0^k(x, y)$, in each pixel $(x, y)$ of the image $A_0^k$ is poorly estimated. Propagation of the image of the sample from the detection plane $P_0$ to the reconstruction plane $P_z$ is then accompanied by substantial reconstruction noise, as mentioned with regard to the prior art. This reconstruction noise takes the form of fluctuations in the reconstructed image. Because of these fluctuations, a noise indicator $\varepsilon^k$, such as defined above, increases in value as the contribution of the reconstruction noise, in the reconstructed image, increases. Specifically, the fluctuations due to the reconstruction noise tend to increase the value of this indicator.

FIGS. 3A and 3B schematically show a radial profile of the modulus (or of a phase) of a reconstructed image, being affected by a substantial amount of and little reconstruction noise, respectively. A sample including a dispersion of particles 10b in a transparent homogeneous medium 10a is considered here. The schematic profiles include two substantial fluctuations, each being representative of a particle 10b. The profile of FIG. 3A also includes fluctuations of smaller amplitude, and of high frequency, that are representative of reconstruction noise. The noise indicator $\varepsilon^k$, such as defined above, is larger in FIG. 3A than in FIG. 3B. The use of an indicator $\varepsilon^k$ based on a norm of order higher than 1 could also be suitable, but such a norm tends to attenuate the low-amplitude fluctuations, which are representative of the reconstruction noise, with respect to the large fluctuations, which are representative of the sample. Conversely, a norm of order 1, or of order lower than 1, does not attenuate the small fluctuations with respect to the large fluctuations. For this reason, the inventors prefer a reconstruction noise indicator $\varepsilon^k$ based on a norm of order 1 or lower than 1.

An important aspect of this step consists in determining, in the detection plane $P_0$, phase values $\varphi_0^k(x, y)$ for each pixel of the image of the sample $A_0^k$, this allowing, in a following iteration, a reconstructed image $A_z^{k+1}$ to be obtained the indicator of which $\varepsilon^{k+1}$ is lower than the indicator $\varepsilon^k$.

In the first iteration, as explained above, relevant information is available only on the intensity of the light wave 22 and not on its phase. The first image $A_z^{k=1}$ reconstructed in the reconstruction plane $P_z$ is therefore affected by a substantial amount of reconstruction noise, because of the absence of relevant information as to the phase of the light wave 22 in the detection plane $P_0$. Therefore, the indicator is high. In following iterations, the algorithm carries out a gradual adjustment of the phase $\varphi_0^k(x, y)$ in the detection plane $P_0$, so as to gradually minimize the indicator $\varepsilon^k$.

The image $A_0^k$ in the detection plane is representative of the light wave 22 in the detection plane $P_0$, both from the point of view of its intensity and of its phase. Steps 120 to 160 aim to establish, iteratively, for each pixel of the image $A_0^k$, the value of the phase $\varphi_0^k(x, y)$ which minimizes the indicator $\varepsilon^k$, the latter being obtained from the image $A_z^k$ obtained by propagating the image $A_0^{k-1}$ to the reconstruction plane $P_z$.

The minimization algorithm may be a gradient descent algorithm, or a conjugated gradient descent algorithm, the latter being described below.

Step 150: Adjustment of the Value of the Phase in the Detection Plane.

Step 150 aims to determine a value of the phase $\varphi_0^k(x, y)$ of each pixel of the complex image $A_0^k$, so as to minimize, in the following iteration k+1, the indicator $\varepsilon^{k+1}$ resulting from a propagation of the complex image $A_0^k$ to the reconstruction plane $P_z$.

To do this, a phase vector $\varphi_0^k$ is established, each term of which is the phase $\varphi_0^k(x, y)$ of a pixel $(x, y)$ of the complex image $A_0^k$. The dimension of this vector is $(N_{pix}, 1)$, where $N_{pix}$ is the number of pixels in question. This vector is updated in each iteration, using the following updating expression:

$$\varphi_0^k(x, y) = \varphi_0^{k-1}(x, y) + \alpha^k p^k(x, y) \qquad (16')$$

where:

$\alpha^k$ is a scalar value, called the "step size", representing a distance;

$p^k$ is a direction vector, of dimension $(N_{pix}, 1)$, each term $p(x, y)$ of which forms a direction of the gradient $\nabla \varepsilon^k$ of the indicator $\varepsilon^k$.

This equation may be expressed in vectorial form as follows:

$$\varphi_0^k = \varphi_0^{k-1} + \alpha^k p^k \qquad (16')$$

It may be shown that:

$$p^k = -\nabla \varepsilon^k + \beta^k p^{k-1} \qquad (17)$$

where:

$\nabla \varepsilon^k$ is a gradient vector, of dimension $(N_{pix}, 1)$, each term of which represents a variation in the indicator $\varepsilon^k$ as a function of each of the degrees of freedom, forming the unknowns of the problem, i.e. the terms of the vector $\varphi_0^k$;

$p^{k-1}$ is a direction vector established in the preceding iteration;

$\beta^k$ is a scale factor applied to the direction vector $p^{k-}$.

Each term $\nabla \varepsilon^k(x, y)$ of the gradient vector $\nabla \varepsilon^k$ is such that $$\nabla \varepsilon^k(r') = \qquad (18)$$

$$\frac{\partial \varepsilon^k}{\partial \varphi_0^k(r')} = -\mathrm{Im}\left(A_0^{k*}(r')\left(\left(S_x * \frac{S_x * A_z^k}{\varepsilon^k} + S_y * \frac{S_y * A_z^k}{\varepsilon^k}\right) * h_z\right)(r')\right)$$

where l m is an operator returning the imaginary part of the operand and r' is a coordinate $(x, y)$ in the detection plane.

The scale factor $\beta^k$ is a scalar value that may be expressed such that:

$$\beta^{(k)} = \frac{\nabla \varepsilon^{(k)} \cdot \nabla \varepsilon^{(k)}}{\nabla \varepsilon^{(k-1)} \cdot \nabla \varepsilon^{(k-1)}}, \qquad (19)$$

where, denotes the scalar product.

The step size $\alpha^k$ may vary depending on the iterations, for example from 0.03 in the first iterations to 0.0005 in the last iterations.

The updating equation allows an adjustment of the vector $\varphi_0^k$ be obtained, this leading to an iterative update of the phase $\varphi_0^k(x, y)$ in each pixel of the complex image $A_0^k$. This complex image $A_0^k$, in the detection plane, is then updated with these new values of the phase associated with each pixel. It will be noted that the modulus of the complex image $A_0^k$ is not modified, the latter being determined from the image acquired by the image sensor, such that $M_0^k(x, y) = M_0^{k=0}(x, y)$.

Step 160: Reiteration of or Exit From the Algorithm.

Provided that a convergence criterion has not been reached, step 160 consists in reiterating the algorithm, with a new iteration of steps 120 to 160, on the basis of the complex image $A_0^k$ updated in step 150.

The convergence criterion may be a preset number K of iterations, or a minimum value of the gradient $\nabla \varepsilon^k$ of the indicator, or a difference considered to be negligible between two consecutive phase vectors $\varphi_0^{k-1}$, $\varphi_0^k$. When the convergence criterion is reached, the estimation is considered to be a correct estimation of a complex image of the sample, in the detection plane $P_0$ or in the reconstruction plane $P_z$.

Step 170: Obtainment of the Reference Complex Image.

At the end of the last iteration, the method may comprise propagating the complex image $A_0^k$ resulting from the last iteration to the reconstruction plane $P_z$, so as to obtain a reference complex image $A_{ref} = A_z^k$. Alternatively, the reference complex image $A_{ref}$ is the complex image $A_0^k$ resulting from the last iteration in the detection plane $P_0$. When the density of the particles is high, this alternative is however less advantageous because the spatial resolution in the detection plane $P_0$ is lower than in the reconstruction plane $P_z$, in particular when the reconstruction plane $P_z$ corresponds to a plane $P_{10}$ in which the sample lies.

FIG. 2E shows an image of the modulus $M_z^{k=30}$ of each pixel of the reference complex image $A_z^{k=30}$ obtained in a reconstruction plane $P_z$ after 30 iterations. This image may be compared to FIG. 2C, showing a similar image $A_z^{k=1}$ obtained in the first iteration. A clear decrease in reconstruction noise is observed, in particular between each particle. Moreover, the spatial resolution of this image allows an improved identification of the radial coordinates (x, y) of each particle. These conclusions also relate to the phase image $\varphi_z^{k=30}$ of each pixel of the reference image $A_{ref} = A_z^{k=30}$.

Step 180: Selection of the Particle Radial Coordinates.

In this step, the radial coordinates (x, y) of a particle are selected from the reference image $A_{ref} = A_z^{k=30}$, for example from the image of its modulus $M_{ref} = M_z^{k=30}$ or from the image of its phase $\varphi_{ref} = \varphi_z^{k=30}$. As mentioned above, the expression radial coordinate designates a coordinate in the detection plane or in the reconstruction plane. It is also envisionable to carry out this selection on the basis of the hologram $I_0$ or on the basis of the complex image $A_0^k$ obtained in the detection plane following the last iteration. However, when the number of particles increases, it is preferable to carry out this selection on the image formed in the reconstruction plane, because of its better spatial resolution, in particular when the reconstruction plane $P_z$ corresponds to the plane of the sample $P_{10}$.

In FIG. 2E, the selection of a particle, which is encircled by a dotted outline, has been shown.

Step 185: Application of a Propagation Operator

In this step 185, the reference complex image $A_{ref}$ is propagated to a plurality of reconstruction distances, using a propagation operator h such as defined above, so as to obtain a plurality of what are called secondary complex images $A_{ref,z}$ reconstructed at various distances from the detection plane $P_0$ or from the reconstruction plane $P_z$. Thus, this step comprises determining a plurality of complex images $A_{ref,z}$ such that:

$$A_{ref,z} = A_{ref} * h_z \tag{20}$$

where $z_{min} \leq z \leq z_{max}$.

The values $z_{min}$ and $z_{max}$ are the minimum and maximum coordinates, along the axis Z, to which the reference complex image is propagated. Preferably, the complex images are reconstructed at a plurality of coordinates z between the sample 10 and the image sensor 16. The complex images may be formed on either side of the sample 10.

These secondary complex images are established by simply applying a holographic reconstruction operator h to the reference image $A_{ref}$. The latter is a complex image correctly describing the light wave 22 to which the image sensor is exposed, and in particular its phase, following the iterations of the steps 120 to 160. Therefore, the secondary images $A_{ref,z}$ form a good descriptor of the propagation of the light wave 22 along the propagation axis Z. They are obtained very simply from the reference complex image. Consequently, it is easily possible to obtain, from the reference complex image, a number of reconstructed images, and this can be done quickly since the straightforward application of a propagation operator to the reference complex image is an operation requiring little expenditure of time.

Step 190: Formation of a Profile

In this step, from each secondary complex image $A_{ref,z}$, a characteristic quantity of the light wave 22 is determined so as to define a profile representing the variation in said characteristic quantity along the propagation axis Z. The characteristic quantity may be:

the modulus, in which case the profile is formed from the modulus $M_{ref,z}(x, y)$ of each secondary complex image $A_{ref,z}(x, y)$ at the previously selected radial position (x, y). A profile M(z) is then obtained;

the phase, in which case the profile is formed from the phase $\varphi_{ref,z}(x, y)$ of each secondary complex image $A_{ref,z}(x, y)$ at the previously selected radical position (x, y). A profile $\varphi(z)$ is then obtained;

a combination of the modulus and the phase of each image, for example in the form of a ratio $$k(x, y) = \frac{\varphi_{ref,z}(x, y)}{M_{ref,z}(x, y)}.$$

A profile k(z) is then obtained.

FIG. 2F shows the variation in the phase $\varphi(z)$ of the light wave 22 along the propagation axis Z.

Step 200: Characterization

The particle may then be characterized from the profile formed in the preceding step. Preferably, there is available a database of standard profiles formed in a learning phase using known standard samples. The characterization is then carried out by comparing or classifying the formed profile on the basis of the standard profiles.

In the example that has been given, the quantity $\varepsilon^k(x, y)$, associated with each pixel, implemented in step 130, is based on a dimensional derivative in each pixel (x, y) of the image $A_z^k$. According to one variant, the initial image $A_0^{k=0}$ is normalized, as described above, by a scalar value or an image representative of the incident wave 12. In this way, in each pixel, the modulus of the image of the sample, in the detection plane or in the reconstruction plane, is smaller than or equal to 1. The quantity $\varepsilon^k(x, y)$ associated with each pixel, in step 130, is a modulus of a difference in the image $A_z^k$, in each pixel, and the value 1. Such a quantity may be obtained using the expression:

$$\varepsilon^k(x, y) = \sqrt{(A_z^k(x,y)-1)(A_z^k(x,y)-1)^*} = |A_z^k(x, y)-1| \tag{20}$$

and, in step 140, $$\varepsilon^k = \Sigma_{(x, y)} \varepsilon^k(x, y) \tag{21},$$

which corresponds, in a non-discretized form, to $$\varepsilon^k(A_z^k) = \int |A_z^k - 1| = \int dr \cdot \sqrt{(A_z^k(r)-1)(A_z^k(r)-1)^*} \quad (22),$$

r denoting a radical coordinate in the reconstruction plane.

The noise indicator is once again a norm of order 1 of a vector $E^k$, each term of which is the modulus $\varepsilon^k(x, y)$ calculated in each pixel.

It can be shown that the gradient of this noise indicator $\varepsilon^k$, with respect to the phase vector, is such that:

$$\nabla \varepsilon^k(r') = \frac{\partial \varepsilon^k}{\partial \varphi_0^k(r')} = \mathrm{Im}(A_0^{k*})(r') \cdot \left( \frac{(A_z^k - 1)}{|A_z^k - 1|} * h_z \right)(r') \quad (23)$$

r' denoting a radial coordinate in the detection plane.

Like the norm of total variation types, described above in conjunction with expression (15), the use of such an indicator is suitable for a sample including particles 10b dispersed in a homogeneous medium 10a. In the gradient descent algorithm, this indicator tends to reduce the number of pixels having a modulus that is not equal to 1 to discretely distributed zones in the image of the sample, these zones corresponding to the particles 10b of the sample.

According to another variant, in step 130, the norm is such that:

$$\varepsilon^k(x, y) = ((A_z^k(x, y))(A_z^k(x, y))^* - 1) = |A_z^k(x, y)|^2 - 1 \quad (25)$$

and, in step 140, $$\varepsilon^k = \tfrac{1}{2} \Sigma_{(x, y)} (\varepsilon^k(x, y))^2 \quad (26),$$

which corresponds, in a non-discretized form, to $$\varepsilon^k = \frac{1}{2} \int \left( |A_z^k|^2 - 1 \right)^2 \quad (27)$$

Like in the preceding embodiments, step 130 includes calculating a quantity $\varepsilon^k(x, y)$ associated with each pixel, based on a modulus of the complex image $A_z^k$, then calculating a noise indicator associated with the complex image $A_z^k$ based on a norm. According to this variant, the norm is of order 2.

It can be shown that the gradient of this indicator, with respect to the phase vector, is such that:

$$\nabla \varepsilon^k(r') = \frac{\partial \varepsilon^k}{\partial \varphi_0^k(r')} = 2\mathrm{Im} A_0^{k*} \left( (|A_z^k|^2 - 1) A_z^k \right) * h_z(r') \quad (28)$$

According to another variant, in step 130, the quantity associated with each pixel is such that $$\varepsilon^k(x, y) = ((A_z^k(x, y))(A_z^k(x, y))^* - 1) = |A_z^k(x, y)|^2 - 1 \quad (30)$$

and, in step 140, $$\varepsilon^k = \Sigma_{(x, y)} \varepsilon^k(x, y) \quad (31),$$

which corresponds, in a non-discretized form, $$\varepsilon^k = \frac{1}{2} \int \left| |A_z^k|^2 - 1 \right|. \quad (32)$$

The quantity associated with each pixel is identical to the preceding variant (cf. equation (25)), but the noise indicator associated with the image is calculated according to a norm of order 1.

According to another variant, in step 130, the quantity associated with each pixel is such that $$\varepsilon^k(x, y) = |\sqrt{(A_z^k(x,y))(A_z^k(x,y))^*} - 1| = |A_z^k(x, y)| - 1 \quad (35)$$

and, in step 140, $$\varepsilon^k = \Sigma_{(x, y)} \varepsilon^k(x, y) \quad (36),$$

which corresponds, in a non-discretized form, to $$\varepsilon^k = \frac{1}{2} \int \left| |A_z^k| - 1 \right| \quad (37)$$

Thus, regardless of the embodiment, the noise indicator $\varepsilon^k$ associated with a complex image $A_z^k$ may be obtained by:

calculating a quantity in a plurality of pixels of the image, based on a value of the latter, a modulus of the latter or on a dimensional derivative of the latter;

combining said quantities in the form of a norm, and preferably a norm of order smaller than 1.

FIG. 4 summarizes the main steps of the algorithm described above: from an image $I_0$ acquired by the image sensor 16, an initial image $A_0^{k=0}$ is formed. In each iteration k, a complex image $A_z^k$, representing the light wave 22 in a reconstruction plane $P_z$, is established by digital propagation of an image $A_0^k$ representing the light wave 22 in the detection plane $P_0$. A noise indicator $\varepsilon^k$ is associated with the image $A_z^k$. Its gradient $\nabla \varepsilon^k$, according to the phase $\varphi_0^k$ of the light wave 22, in the detection plane $P_0$, is calculated, on the basis of which said phase of the light wave 22, in the detection plane, is updated. This update makes it possible to form a new complex image $A_0^{k+1}$ in the detection plane $P_0$, on the basis of which a new iteration may be carried out. After reaching a convergence criterion, a reference image $A_{ref}$ is obtained, which is, in this example, the image obtained by propagation of the image $A_0^k$, obtained in the last iteration, in the plane of the sample $P_{10}$ (step 170). This reference image makes it possible to select a radial position (x, y) of a particle to be examined (step 180). A propagation operator h is applied thereto, so as to form a plurality of secondary complex images $A_{ref,z}$, at a plurality of coordinates along the propagation axis Z (step 185). On the basis of the value of the various secondary images $A_{ref,z}$ at the selected radial position, a profile of a characteristic quantity of the light wave 22 along the propagation axis is obtained (step 190).

In the embodiments described above, the indicator $\varepsilon^k$ describes a function that increases with the reconstruction noise. Stated otherwise, the more substantial the amount of reconstruction noise, the larger the indicator $\varepsilon^k$. The optimization algorithm therefore tends to minimize this indicator, in particular on the basis of its gradient $\nabla \varepsilon^k$. The invention may of course be applied using an indicator describing a function that decreases with the reconstruction noise, the indicator becoming smaller as the reconstruction noise increases. The optimization algorithm then tends to maximize this indicator, in particular on the basis of its gradient. In general, it is preferable for the noise indicator to follow a monotonic function of the cumulative amplitude of the reconstruction noise in the complex image.

The invention was implemented, using the norm of the total variation, on CHO (Chinese hamster ovary) cells immersed in a CD CHO culture medium (Thermo Fisher). The sample was placed in a fluidic chamber of 100 μm thickness and positioned at a distance of 8 cm from a light-emitting diode, the spectral band of which was centered on 450 nm. The sample was placed at a distance of 1500 μm from a CMOS image sensor of 2748×3840 pixels. The aperture of the spatial filter 18 had a diameter of 150 μm.

FIG. 5A shows the image $I_0$ acquired by the image sensor 16. The images of the modulus and of the phase of the reference complex image $A_{ref}$, in the plane $P_{10}$ of the sample, are shown in FIGS. 5B and 5C, respectively. These images were obtained in 100 iterations. The uniformity of the gray-scale representation of each cell attests to the quality of the reconstruction. A propagation operator h such as described above was applied to this reference image in order to obtain a plurality of secondary complex images $A_{ref,z}$ along the propagation axis Z. Moreover, in the image of the modulus or in the image of the phase of the reference image, two cells were identified, respectively encircled by a black dashed outline (cell 10b-1) and a black dotted outline (cell 10b-2) in FIGS. 5B and 5C. The radial coordinates (x, y) of these two cells were extracted. For each cell, a profile M(z) representative of the modulus and a profile φ(z) representative of the phase of the light wave 22 reaching the image sensor 16 were formed. The value of each point of the profile is obtained by determining the modulus and phase of a respective secondary complex image $A_{ref,z}$ at said radial coordinates (x, y).

FIGS. 5D and 5E respectively show the profile of the modulus and of the phase of the cell 10b-1. FIGS. 5F and 5G respectively show the profile of the modulus and of the phase of the cell 10b-2. Each profile was determined between the coordinates $Z_{min}$=552 μm and $Z_{max}$=2152 μm with a z-wise step size of 40 μm. The reconstruction plane is located 1352 μm away from the detection plane.

Moreover, following these reconstructions, the cells were treated with Trypan blue, then observed using a microscope at a 10× magnification. Trypan blue is a dye commonly used for determining cell viability. The image obtained is shown in FIG. 5H. The cell 10b-1 is a living cell, whereas the cell 10b-2 appears to be a dead cell.

The profiles of modulus or phase of FIGS. 5D and 5E may be considered to be representative of a living CHO cell, whereas FIGS. 5F and 5G may be considered to be representative of a dead CHO cell. CHO cells may be characterized on the basis of such profiles.

Another example is presented in FIGS. 6A to 6E. In these examples, the sample includes red blood cells diluted in an aqueous solution including a phosphate-buffered saline (PBS) buffer diluted to 1/400. The sample 10 was placed in a fluidic chamber 15 of 100 μm thickness, which chamber was placed at a distance of 8 cm from the light-emitting diode, described above, the spectral band of which was centered on 450 nm. The sample was placed at a distance of 1.5 mm from the CMOS image sensor described above. The aperture of the spatial filter 18 was 150 μm in size.

FIG. 6A shows the image $I_0$ acquired by the image sensor. The images of the modulus and of the phase of the reconstructed complex image $A_z^{k=8}$, in the plane $P_{10}$ of the sample, are shown in FIGS. 6B and 6C, respectively. These images were obtained in 8 iterations.

The image $A_z^{k=8}$ forms a reference image $A_{ref}$ to which the propagation operator h as described above was applied, so as to obtain a plurality of secondary complex images $A_{ref,z}$ along the propagation axis Z. Moreover, in the image of the modulus or in the image of the phase of the reference image, a red blood cell was identified, the latter being encircled by a dotted line in each of these images. The radial coordinates (x, y) of this red blood cell were extracted. From the secondary images $A_{ref,z}$, a profile M(z) representative of the modulus and a profile φ(z) representative of the phase of the light wave 22 reaching the image sensor 16 were formed. The value of each point of the profile is obtained by determining the modulus and phase of a respective secondary image at said radial coordinates. FIGS. 6D and 6E respectively show the profile of the modulus and of the phase of the red blood cell thus selected. The profile was determined between the coordinates $z_{min}$=1000 μm and $z_{max}$=2000 μm with a z-wise step size of 5 μm. The reconstruction plane is located 1380 μm away from the detection plane, this corresponding to the abscissa 78 in FIGS. 6D and 6E.

This test was reiterated on the basis of another hologram $I_0$ shown in FIG. 7A. FIGS. 7B and 7C respectively show the images of the modulus and of the phase of a complex image $A_z^{k=8}$ reconstructed in the plane of the sample $P_{10}$ after eight iterations. Radial coordinates (x, y) for a red blood cell were retrieved from these images. The complex image $A_z^k$ was propagated at various coordinates along the propagation axis Z so as to obtain the same number of secondary images $A_{ref,z}$ from which a profile M(z) representative of the module (FIG. 7D) and a profile φ(z) representative of the phase (FIG. 7E) of the light wave 22 reaching the image sensor 16 were formed.

FIG. 8A shows an image $I_0$ acquired by the image sensor, the observed sample being an emulsion formed of droplets of index-matching oil, the refractive index of which is equal to 1.38 (reference Series AAA n=1.3800±0.0002, produced by Cargille Labs) suspended in a PBS (phosphate buffer saline) buffer. The size of the droplets shown in these images is comprised between 5 and 9 μm. The sample is placed in a fluid chamber 15 with a thickness of 100 μm, 8 cm away from a spatial filter having a diameter of 150 μm placed downstream of a light-emitting diode emitting in a spectral band which is centered around 450 nm. The distance between the sample and the detector is 1.5 mm. The images of the modulus and of the phase of the reconstructed complex image $A_z^{k=8}$, based on the hologram $I_0$, in the plane of the sample $P_{10}$, are respectively shown in FIGS. 8B and 8C. These images were obtained in eight iterations. In each of these images, a droplet was identified, surrounded by a dotted outline. The radial coordinates (x, y) for this droplet were retrieved. A profile M(z) representative of the modulus and a profile φ(z) representative of the phase of the light wave 22 reaching the image sensor 16, passing through the droplet, were formed. The value of each point of the profile is obtained by determining the modulus and phase of a respective secondary image at said radial coordinates. FIGS. 8E and 8G respectively show the profile of the modulus and the phase of the light wave 22 reaching the image sensor 16.

Furthermore, the image $I_0$ acquired by the image sensor, i.e. the hologram, was used as a reference complex image. This image underwent digital propagation along a plurality of coordinates z, so as to obtain secondary complex images, from which the profiles of the modulus and of the phase of each secondary complex image were obtained. FIGS. 8D and 8F respectively show the profile of the modulus and of the phase thus obtained.

The profile was determined between the coordinates $z_{min}$=1000 μm and $z_{max}$=2000 μm with a z-wise step size of 5 μm. The reconstruction plane is located at 1380 μm from the detection plane, this corresponding to the abscissa 76 in FIGS. 8D to 8G.

Thus, FIGS. 8D and 8F are profiles obtained by applying the propagation operator h directly to the hologram $I_0$ acquired by the detector 16, while FIGS. 8E and 8G are profiles obtained by applying the propagation operator to a reference $A_{ref}$ complex image implementing the method described above on the basis of said hologram $I_0$. It can be seen that the profiles formed on the basis of propagation of the reference image (FIGS. 8E and 8G) exhibit a greater dynamic range than those obtained on the basis of propagation of the hologram (FIGS. 8D and 8F), information relating to the phase being absent from the latter.

The characterization of a particle may also allow its volume to be estimated, which is particularly the case for spherical particles. FIG. 9A shows the modulus of a reference complex image obtained from a sample including latex beads of 3 μm and 5 μm in diameter suspended in a phosphate buffer saline (PBS). The latex beads are beads supplied by DUKE under the references 4205A (5 μm in diameter) and 4203A (3 μm in diameter). The sample includes 19 3 μm beads and 55 5 μm beads. The sample is 100 μm thick. The sample is illuminated in the blue spectral band, centered on 450 nm, defined above. For each particle, a propagation operator was applied to the reference complex image, so as to obtain a number of reconstructed images. Next, the profile of the modulus and of the phase of each complex image was determined, the profile passing through the center of each particle as they appear in FIG. 9A. FIGS. 9B and 9C respectively show the profiles of the modulus and of the phase obtained for various particles. The profiles outlined in black and in gray respectively correspond to the beads of 5 μm and 3 μm in diameter. It can be seen that the profiles form a signature of the volume of each bead. Specifically, the profiles corresponding to particles of the same volume describe one and the same variation along the axis Z. It is then possible to characterize each profile according to a discriminating criterion applied to the profile, so as to discriminate between the beads according to their volume, which also makes it possible to perform a count of the beads of the same volume. This discriminating criterion may be a difference between the maximum value of the profile and the minimum value thereof, a criterion of full width at half maximum, or a criterion of height between the maximum value of the profile and the minimum value thereof.

In order to assess the reproducibility of this method, another test was carried out using other latex beads, in this instance 15 3 μm beads and 30 5 μm beads. The sample is illuminated in the green spectral band, centered on 540 nm. FIG. 9D shows the modulus of the reference complex image. FIGS. 9E and 9F respectively show the profiles of the modulus and phase obtained for various particles, using the same color code. It can again be seen that a classification of the beads according to their volume may be carried out on the basis of the amplitude or phase profiles.

Regardless of the embodiment, the method includes a selection of a plurality of radial coordinates representative of one and the same particle, for example adjacent radial coordinates corresponding to one and the same particle. On the basis of the secondary complex images, the method includes the determination of a characteristic quantity at each of the selected radial coordinates. In this way, the number of profiles formed, along the axis Z, is the same as the number of selected coordinates. These profiles, referred to as elementary profiles, may be combined, for example in the form of a mean, so as to form a profile representative of the particle.

Regardless of the embodiment, the estimation of a distance between the detection plane $P_0$ and the plane of the sample $P_{10}$ may be necessary, in particular when the reference complex image is formed in the plane of the latter. This distance may be geometrically known, or may be estimated by implementing an autofocus algorithm, common in the field of holographic reconstruction.

The invention could be applied to the observation of a sample by holographic reconstruction, the hologram being obtained either by lensless imaging or by defocused imaging. In this case, the hologram is an image acquired by an image sensor, in a plane other than the focal plane of an optical system coupled to the image sensor.

It could be applied to the characterization of samples in the field of biotechnology or of diagnostics, as well as in the field of food and agriculture, or of the analysis of samples taken from the environment or from industrial processes.

The invention claimed is:

1. A method for characterizing a particle contained in a sample, the method comprising:
    a) illuminating the sample using a light source, the light source emitting an incident light wave propagating towards the sample along a propagation axis;
    b) acquiring, using an image sensor, an image of the sample, formed in a detection plane, the sample being positioned between the light source and the image sensor, the image being representative of a light wave transmitted by the sample under effect of the illumination;
    c) applying a propagation operator to the image acquired in b), to calculate a reference complex image, which is a complex image representative of the sample in a reconstruction plane;
    d) selecting a radial position of the particle in a plane parallel to the detection plane;
    e) from the reference complex image calculated in c), determining at least one characteristic quantity of the light wave transmitted by the sample, at a plurality of distances from the detection plane or from the reconstruction plane, wherein e) further includes :
        ei) applying a propagation operator to the reference complex image, to calculate secondary complex images for a plurality of distances from the reconstruction plane or from the detection plane; and
        eii) determining a characteristic quantity of the light wave transmitted by the sample at each of the plurality of distances, from the secondary complex images;
    f) forming a profile representing a variation of the characteristic quantity determined in e) along an axis parallel to the propagation axis, the axis passing through the radial position selected in d); and
    g) characterizing the particle using the profile formed in f),
    wherein g) includes at least one of
    classifying the particle according to a plurality of predetermined particle classes,
    determining of a state of the particle, according to a plurality of predetermined states,
    estimating a geometric parameter of the particle, and
    estimating an optical parameter of the particle.

2. The method of claim 1, wherein at least one characteristic quantity is determined from a modulus or an argument of a secondary complex image.

3. The method of claim 1, wherein the characterization is performed by comparing the profile formed in f) with profiles determined in a learning phase.

4. The method of claim 1, wherein, in d), the radial position of the particle is selected using the image acquired in b) or using the reference complex image calculated in c).

5. The method of claim 1, wherein no magnifying optics are placed between the sample and the image sensor.

6. The method of claim 1, wherein:
d) further includes selecting a plurality of radial coordinates that are representative of a same type of particle;
f) further includes forming a plurality of elementary profiles, at each selected radial coordinate, and combining the elementary profiles so as to form a profile representative of the particle.

7. The method of claim 1, wherein, in c), the calculation of the reference complex image comprises:
ci) defining an initial image of the sample in the detection plane, from the image acquired by the image sensor;
cii) determining a complex image of the sample in a reconstruction plane by applying a propagation operator to the initial image of the sample defined in ci) or to the image of the sample in the detection plane resulting from the preceding iteration;
ciii) calculating a noise indicator from the complex image determined in cii), the noise indicator depending on a reconstruction noise affecting the complex image;
civ) updating the image of the sample in the detection plane by adjusting phase values of the pixels of the image, the adjustment being carried out according to a variation of the indicator calculated in ciii) with the phase values;
cv) reiterating cii) to civ) until a convergence criterion is reached, so as to obtain a complex reference image of the sample in the detection plane, or in the reconstruction plane.

8. The method of claim 7, wherein ciii) further includes:
for various pixels, calculating a quantity associated with each pixel, according to the value of the complex image determined in cii) for the pixel, or of a dimensional derivative of the complex image image for the pixel;
combining the quantities associated with various pixels, to obtain the noise indicator.

9. The method of claim 8, wherein the noise indicator is a norm of order lower than or equal to 1, calculated from the quantities associated with each pixel.

10. The method of claim 8, wherein, in ciii), the quantity associated with each pixel is calculated from the modulus of a dimensional derivative, for the pixel, of the complex image determined in cii).

11. The method of claim 8, wherein:
in ci), the initial image of the sample is defined by a normalization of the image acquired by the image sensor by an image representative of the light wave emitted by the light source;
in ciii), the quantity associated with each pixel is calculated according to the value of the complex image determined in cii), for the pixel, subtracted from a strictly positive number, in particular the number 1.

12. The method of claim 7, wherein, in civ), the value of the phase of each pixel is adjusted by forming a vector, referred to as the phase vector, each term of which corresponds to the value of the phase of a pixel of the image of the sample in the detection plane, this vector being updated, in each iteration, so as to minimize or to maximize the noise indicator calculated in ciii), on the basis of a gradient of the noise indicator according to each term of the phase vector.

13. The method of claim 1, wherein the particle is chosen from: a cell or a microorganism or a microbead or an exosome or a droplet of an emulsion or a cell nucleus or a piece of cellular debris.

14. A device for characterizing a particle contained in a sample, the device including:
a light source configured to emit an incident light wave propagating towards the sample along a propagation axis;
an image sensor configured to acquire an image of the sample, formed in a detection plane, the sample being positioned between the light source and the image sensor, the image being representative of a light wave transmitted by the sample under effect of the illumination;
a holder, configured to hold the sample between the light source and the image sensor;
a processor, configured to receive the image of the sample acquired by the image sensor and
apply a propagation operator to the image acquired, to calculate a reference complex image, which is a complex image representative of the sample in a reconstruction plane;
select a radial position of the particle in a plane parallel to the detection plane;
from the reference complex image calculated, determine at least one characteristic quantity of the light wave transmitted by the sample, at a plurality of distances from the detection plane or from the reconstruction plane, by:
applying a propagation operator to the reference complex image, to calculate secondary complex images for a plurality of distances from the reconstruction plane or from the detection plane; and
determining a characteristic quantity of the light wave transmitted by the sample at each of the plurality of distances, from the secondary complex images;
forming a profile representing a variation of the characteristic quantity determined along an axis parallel to the propagation axis, the axis passing through the radial position selected; and
characterizing the particle using the profile formed,
wherein the characterizing includes includes at least one of
classifying the particle according to a plurality of predetermined particle classes,
determining of a state of the particle, according to a plurality of predetermined states,
estimating a geometric parameter of the particle, and
estimating an optical parameter of the particle.

* * * * *

UNITED STATES PATENT AND TRADEMARK OFFICE
CERTIFICATE OF CORRECTION

PATENT NO. : 10,845,286 B2  
APPLICATION NO. : 16/086922  
DATED : November 24, 2020  
INVENTOR(S) : Cedric Allier et al.

Page 1 of 1

It is certified that error appears in the above-identified patent and that said Letters Patent is hereby corrected as shown below:

On the Title Page

On Page 2, Column 2, Item (56), under "OTHER PUBLICATIONS", Line 10, delete "Mathmatical" and insert --Mathematical--;

In the Claims

In Column 22, Claim 1, Line 40, delete "includes :" and insert --includes:--;

In Column 22, Claim 1, Line 55, delete "of" and insert --of:--;

In Column 23, Claim 7, Line 21, delete "iteration ;" and insert --iteration;--;

In Column 23, Claim 8, Line 38, delete "image image" and insert --image--;

In Column 24, Claim 14, Line 25, delete "sensor and" and insert --sensor; and--;

In Column 24, Claim 14, Line 31, delete "plane:" and insert --plane;--;

In Column 24, Claim 14, Line 50, delete "includes includes" and insert --includes--; and In Column 24, Claim 14, Line 51, delete "of" and insert --of:--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*